United States Patent [19]
Dawn et al.

[11] 4,107,363
[45] Aug. 15, 1978

[54] LIGHTWEIGHT ELECTRICALLY-POWERED FLEXIBLE THERMAL LAMINATE

[75] Inventors: Frederic S. Dawn; Dale G. Sauers, both of Houston, Tex.

[73] Assignee: The United States of America as represented by the Administrator, National Aeronautics and Space Administration, Washington, D.C.

[21] Appl. No.: 540,779

[22] Filed: Jan. 14, 1975

[51] Int. Cl.² .............................................. B32B 5/00
[52] U.S. Cl. .................................... 428/109; 428/247; 428/258; 428/259
[58] Field of Search ....................... 161/57, 58, 59, 89, 161/91, 213, 214, 221; 428/107, 108, 109, 113, 224, 257, 258, 259, 247

[56] References Cited
U.S. PATENT DOCUMENTS

| | | | |
|---|---|---|---|
| 2,384,771 | 9/1945 | Ryan | 161/91 |
| 2,732,020 | 1/1956 | Scholl | 161/221 |
| 3,069,746 | 12/1962 | Scharf | 161/91 |
| 3,087,699 | 4/1963 | Foster | 161/91 |
| 3,231,042 | 1/1966 | Chapman | 161/91 |

Primary Examiner—James J. Bell
Attorney, Agent, or Firm—Marvin J. Marnock; John R. Manning; Marvin F. Matthews

[57] ABSTRACT

A lightweight, active thermal control mechanism for spacecraft use comprised of woven or unwoven cross-layered yarns where one set of yarns are composed of flexible electrically conductive metal fibers which are capable of being resistance-heated by the application of voltage and another set of yarns which are electrically non-conductive and flexible. The non-conductive yarns provide mechanical strength and preclude the passage of electrical current between metal yarns by virtue of the spacing between them. A lightweight, electrically non-conductive film is bonded to the cross-layered yarns to protect the metal yarns from the elements (minimize electrical shorts from moisture, e.g., rain), provide additional strength to the fabric and to prevent the conductive loss of heat in non-vacuum applications. The non-conductive film is metalized on its obverse side to provide a more uniform heat load distribution.

4 Claims, 2 Drawing Figures

LIGHTWEIGHT ELECTRICALLY-POWERED FLEXIBLE THERMAL LAMINATE

ORIGIN OF THE INVENTION

The invention described herein was made by employees of the United States Government and may be manufactured and used by or for the Government of the United States of America for governmental purposes without the payment of any royalties thereon of therefor.

FIELD OF THE INVENTION

This invention relates to thermal control mechanism and more particularly, to a lightweight laminate structure to cover any space component, in a vacuum or non-vacuum environment, and to provide localized controlled heating. The structure may be used in non-space applications where weight, bulk, or stiffness are critical.

A prime consideration and difficulty in space equipment and accessories is weight and weight per available space. A spacecraft containing liquid oxygen and hydrogen is cold enough on its external surface so that ice can form under given meteorological conditions. Ice so formed can cascade during a launch and impinge upon frangible external insulation on a spacecraft and possibly damage the insulation. The failure of insulation could preclude a safe reentry of the spacecraft. Presently available thermal blankets are too heavy and do not have an effective weight-use ratio. For example, the use of electrical blankets woven from non-metallic yarn and electric wires added to the fabric as required for heating generally are heavy, stiff and bulky. One of the problems of reducing weight by reducing size is that the fabric strength rapidly falls off.

SUMMARY OF THE PRESENT INVENTION

In the present invention, the thermal control mechanism consists of lighweight woven or non-woven sets of yarns in which one set of the yarns is composed of flexible, electrically conductive metal fibers capable of being resistance heated by the application of voltage. The remaining set of yarns is electrically non-conductive and is used to provide additional mechanical strength as well as to preclude passage of electrical current between the metal yarns. The non-conductive yarns assure that minimum spacing between metal yarns is maintained. The yarns are integrated with a lightweight plastic, electrically non-conductive film which is bonded to the yarns. The film performs the function of providing additional strength and also prevents convective loss of heat in a non-vacuum aplication. The film is metalized on its obverse side to provide for a more uniform heat load distribution. The multifilament yarns are composed of continuous filament fibers which are fine and flexible.

DESCRIPTION OF THE INVENTION

Figure 1:
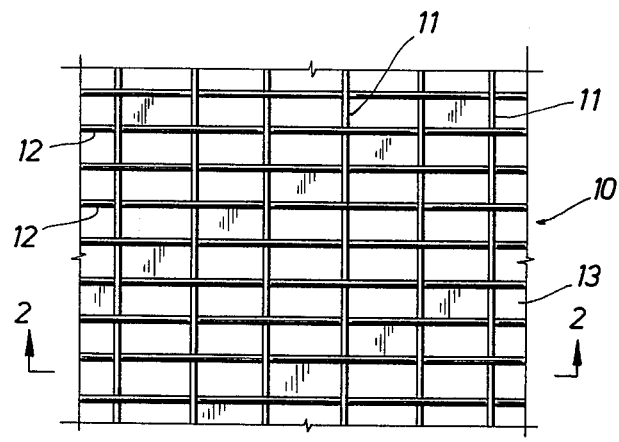
FIG. 1 is a view in plan section of a matrix of metal and electrically non-conductive yarns woven and bonded to a base film in accordance with the present invention.
Figure 2:
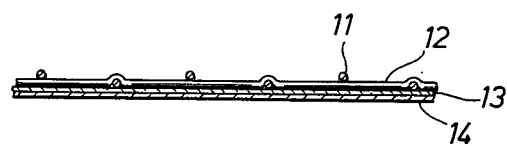
FIG. 2 is a cross-section taken along line 2—2 of FIG. 1.

Referring now to FIGS. 1 and 2 of the drawings, a matrix 10 is formed by interweaving filling yarns or filling 11 with warp-yarns of warps 12. The filling strands 11 are electrically non-conductive yarns formed of multifilament. The warp yarns are electrically conductive metal filaments and can, for example, be of nickel chromium or other conductive material of suitable resistivity. The matrix 10 of yarns 11 and 12 as illustrated in FIGS. 1 and 2 can be woven so that the cross yarns 11 and 12 alternately go over and under one another in a loose weave. A variety of woven constructions is also possible.

A typical weave can be spaced, for example, from 0.1 to 1 centimeter. A typical metal yarn would be composed of 19% chromium, 75% nickel and 4% aluminum in 12 denier [$1.27 \times 10^{-3}$ cm diameter] continuous filament with 91 filaments per yarn in a 3z ply construction.

A matrix of yarns 11 and 12 is integrally attached to a plastic film 13 which is electrically non-conductive. The attachment can be the bonding of the multifilament yarns to the film. The film can have a typical thickness of $1.27 \times 10^{-3}$ centimeters. The film may be constructed of any suitable material such as polyimide.

On the obverse side of the film 13 relative to the matrix is a metallic surface 14 which is deposited on the film 13. The metal surface typically can be aluminum, silver or gold and serves to provide uniform heat load distribution.

The metal yarns 12 of the control mechanism can be coupled to any suitable source of voltage (not shown) so that passage of electrical current through the metal yarns will, by resistance heating, produce a required heat energy. The entire composite film can be shaped to a general configuration as desired to form an enclosure. As such, the enclosure prevents loss of heat while the metalized surface 14 provides for uniform distribution of heat.

Where the yarns are not woven, the metal yarns are placed on the film first and the non-conductive yarns are disposed over metal yarns. All yarns can then be bonded to the base film.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A lightweight heater fabric for localized controlled heating in vacuum and non-vacuum environments where weight, bulk and stiffness are critical, comprising
   a thin electrically non-conductive film forming a base member,
   a matrix formed from cross-layers of yarns composed of electrically conductive metal yarns and electrically non-conductive yarns where said metal yarns are separated from one another,
   said film and matrix being integrally attached to one another, and said film being metalized on the side obverse to said matrix.

2. The fabric as defined in claim 1 wherein said metal yarns are capable of being resistance heated by the application of electrical voltage.

3. The fabric as defined in claim 2 having a weight from 2 to 3 ounces per square yard.

4. The fabric as defined in claim 2 wherein said metal yarns are about $1.27 \times 10^{-3}$ cm in diameter with 91 filaments per yarn in a 3z ply construction, said filling is about $1.27 \times 10^{-3}$ cm in thickness, and said matrix has a weave spacing from 0.1 to 1 centimeter.

* * * * *